Dec. 15, 1953 F. J. SINGER 2,662,933

MULTIPLEX CARRIER TELEGRAPH SYSTEM

Filed April 26, 1951 2 Sheets-Sheet 1

INVENTOR
F. J. SINGER
BY H. A. Burgess
ATTORNEY

MULTIPLEX CARRIER TELEGRAPH SYSTEM

Filed April 26, 1951

INVENTOR
F. J. SINGER

BY H. A. Burgess

ATTORNEY

Patented Dec. 15, 1953

2,662,933

UNITED STATES PATENT OFFICE 2,662,933

MULTIPLEX CARRIER TELEGRAPH SYSTEM

Fred J. Singer, Rockville Centre, N. Y., assignor to Bell Telephone Laboratories, Incorporated, New York, N. Y., a corporation of New York Application April 26, 1951, Serial No. 222,954

5 Claims. (Cl. 178—51)

The present invention relates to multiplex carrier telegraphy and more particularly to improvements making for greater economy in design and construction and greater flexibility in operation of a multiplex carrier telegraph system.

The usual commercial type of voice frequency carrier telegraph system has each of its channels operating within fixed frequency limits imposed by the design of oscillators, filters or other circuit elements, the frequencies differing for each channel. These frequency limits as well as the other design factors have been worked out to allow a large number of channels to be operated within the total available band, to minimize cross-talk and interference and to give reliable performance.

Requirements arise for partial service involving less than the full number of channels, and involving different numbers of channels in different locations which may need to be associated in different ways at different times. Such requirements can occur in military applications or in certain types of civilian or commercial activities. In many such cases portability is also a requirement.

The common commercial type of system referred to above is not adapted to meet the requirements of flexibility and portability. For example, complete flexibility would require that a full complement of channel components in the form of fixed frequency elements including filters be available at every terminal point in order to assure that any channels to be put to use at these points could be provided. This would be both costly and cumbersome.

Objects of the present invention are to increase the flexibility of a multichannel carrier telegraph system without sacrificing frequency economy, quality or reliability of service, and to facilitate portability. A related object is to achieve substantially complete flexibility in such a system while maintaining substantially the advantageous transmission characteristics of systems of the prior art utilizing fixed frequency elements including filters.

A further object is to properly utilize the frequencies of the waves in such a system so as to permit any channel to be readily adjusted to use any assigned channel frequency within the frequency limits of the system, and at the same time to minimize interchannel interference and spurious frequency components in each receiving channel.

These objects are attained in part by duplicating a large or major portion of the channel equipment in each channel and by making all parts and spare parts for each functional item in the channels interchangeable, thereby simplifying the problems of design, supply and replacement. As an example of its adaptability, the invention makes possible a system in which the equipment is in package form with each package light enough to permit one man to carry it. Such a package can be used with other duplicate packages to build up a multichannel system terminal.

Figure 1:
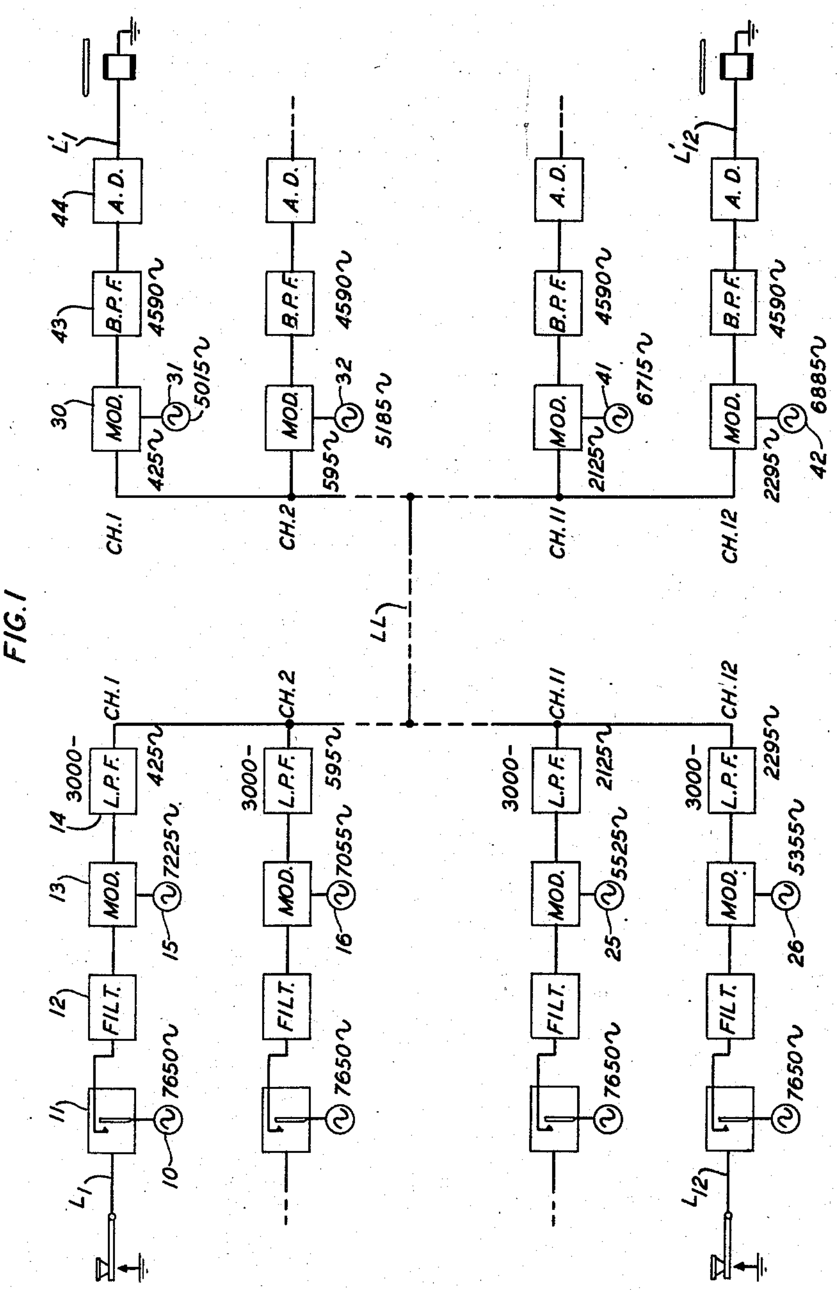
Figure 2:
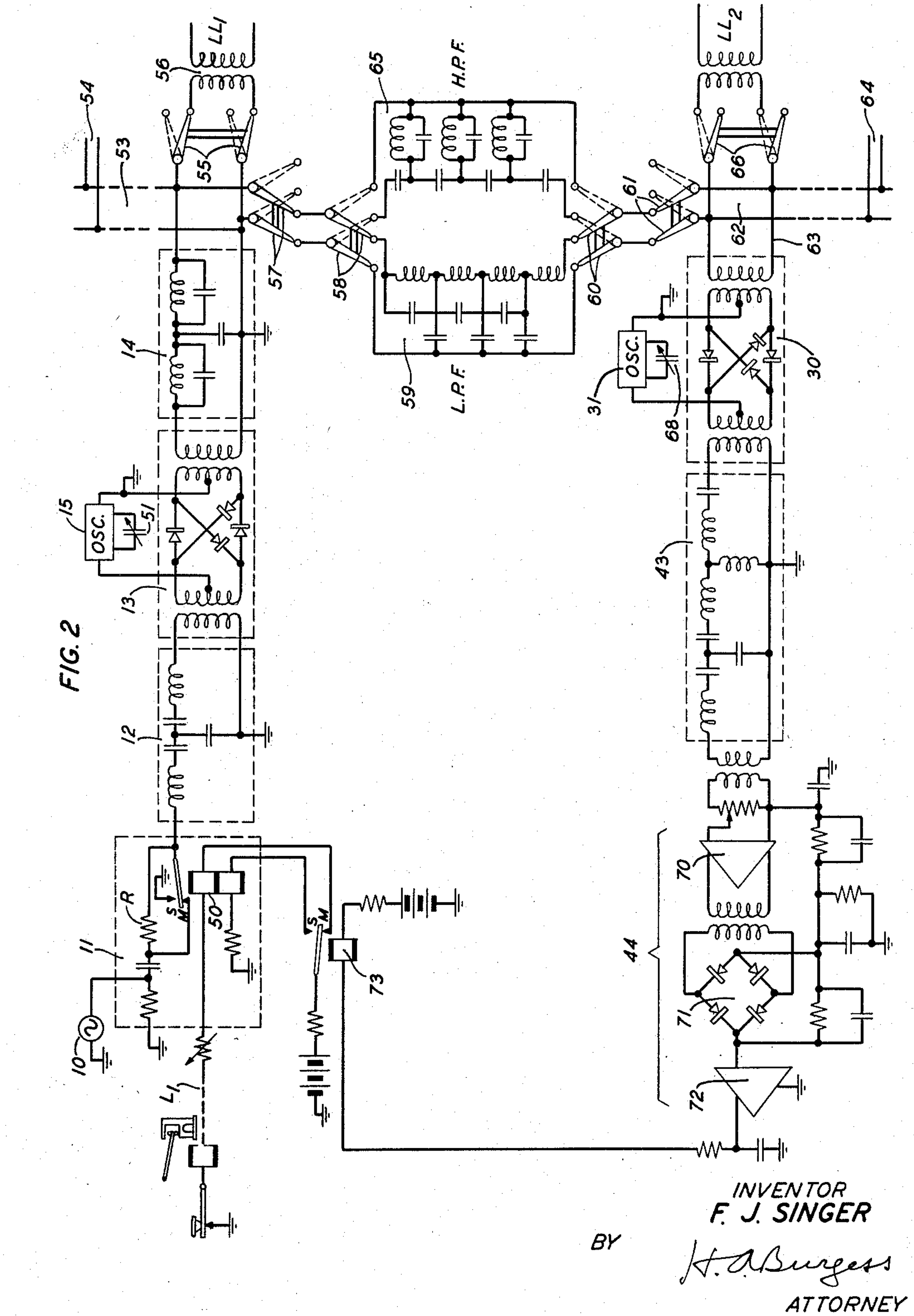

The invention will be more fully understood from the following detailed description in connection with the drawings in which Fig. 1 is a block diagram schematic of a one-way multiplex carrier telegraph system in accordance with the invention; and Fig. 2 is a schematic diagram showing in greater detail the circuits at one terminal for a complete transmitting and receiving channel of such a system.

In Fig. 1 the system is illustrated as a twelve-channel system with the transmitting station at the left and a receiving station at the right, the transmission elements in only four of the channels being shown. The system as shown utilizes one side of a four-wire circuit for transmitting from west to east. The other side of the four-wire circuit for transmitting east to west would be a duplicate of that shown but oppositely directed.

Referring to the sending circuit of channel 1 for example, this comprises a source of telegraph signals, subscriber loop $L_1$, leading up to a high frequency input section incorporating a high frequency controller, the first modulator 11, which may in practice be a transmitting relay, a filter 12 and a second modulator 13, and a low frequency output section. Modulator 11 is supplied with a high frequency wave from a vacuum tube oscillator 10. When the relay contact at 11 is open, no waves from source 10 are transmitted, but when the relay contact 11 is closed under control of the subscriber's sending key, waves from source 10 are applied to the input side of filter 12. This filter has the center of its transmission band corresponding to the frequency of the waves generated in source 10 and has a band width sufficient to accommodate the signaling frequencies. For example, this filter may pass a band 110 cycles wide.

The waves transmitted through the filter 12 are applied to the input of the second modulator 13 which is supplied with high frequency waves from oscillator 15. This modulator produces upper and lower side bands representing sum and difference frequencies of the waves from source 15 and the waves received from filter 12. Only the difference frequencies are utilized, these being selected by low pass filter 14 in the low frequency output section of the sending circuit for transmission to the common line or transmission path LL for all the channels. The frequencies utilized in channel 1 as thus far described are labeled on the drawing, and it will be noted that oscillator 10 generates a frequency of 7650 P. P. S. (periods per second), that oscillator 15 generates a frequency of 7225 P. P. S., and that the low pass filter 14 has a cut-off frequency of 3000 P. P. S. The difference frequency generated in the output of modulator 13 is 425 P. P. S. All of the other combination frequencies in the output of modulator 13 are too high to be transmitted through the filter 14 so that only the 425-cycle component is selected for transmission to the line.

In accordance with one feature of this invention, the equipment in the sending circuits of all of the channels is alike in construction and the only difference between these sending circuits is a difference in the adjustment of the frequency of the second oscillator 15 (16, etc.) of the various channels. For example, oscillator 16, channel 2, is adjusted to operate at a frequency of 7055 P. P. S. or 170 cycles lower than the frequency of oscillator 15. This results in the transmission through the low pass filter of channel 2 of a frequency of 595 P. P. S. which is the carrier frequency used for channel 2. Similarly with each higher numbered channel, the frequency of the second stage oscillator is progressively 170 cycles lower than that of the preceding channel, the lowest oscillator frequency being that of channel 12, namely 5355 P. P. S. giving a transmitted carrier frequency for that channel of 2295 P. P. S.

Referring to the receiving terminal, it will be noted that no separating filters for the different received carriers are used in the receiving circuits of the several channels. While the drawing indicates that the 425 cycle carrier is received in modulator 30 of the low frequency input section of the receiving circuit of channel 1, and this is the only one of the received carriers that will produce signals in the output of receiving channel 1, all of the received carriers are in fact applied to each of the first stage modulators, corresponding to 30 in channel 1, in the low frequency input section of each of the receiving circuits of channels 1 to 12. The received 425 cycle carrier is combined in the first stage receiving modulator 30 of channel 1 with the local carrier wave from source 31 indicated as supplying a frequency of 5015 P. P. S. Filter 43 in the high frequency output section of the sending circuit of channel 1 is a narrow band pass filter having its pass band centered at 4590 P. P. S. Its pass band is just sufficient to allow waves used in one channel to pass and may for example be 4590±55 P. P. S. Of all the received frequencies applied to modulator 30, only those of channel 1, whose carrier frequency is 425 cycles, will produce a difference frequency of 4590 P. P. S., and bands of frequencies closely adjacent thereto representing the signals. All of the other components on the output side of modulator 30 representing currents transmitted by the other channels will have such frequencies as to fall in the high attenuation range of filter 43 and will be suppressed. The frequencies transmitted by filter 43 are impressed on amplifier detector 44 in which they will be converted to direct current telegraph pulses which in turn will be applied to a receiving telegraph relay or other telegraph responder in the receiving subscriber's loop $L_1'$.

In accordance with one feature of this invention, the apparatus used in all of the receiving channels is of the same type, the only difference being in the adjustments made in the first stage beating oscillators 31, 32, etc. of the various channels. For example, the oscillator 32 of channel 2 is adjusted to supply waves of a frequency of 5185 P. P. S., this frequency being of the right value to combine in the first receiving modulator with the received carrier wave of channel 2, 595 cycles, to produce and supply to the following band pass filter a 4590 P. P. S. frequency for reception in channel 2. As in the case of the sending circuit oscillators 15, 16 . . . 25, 26, the adjustment of the frequency of the adjustable oscillator 30, 31 . . . in the receiving circuits of the several channels differs from channel to channel by 170 cycles. Channel 12, for example, which receives a carrier of 2295 P. P. S., has its first stage beating oscillator 42 adjusted to supply a wave of 6885 P. P. S. to its first stage modulator.

It will be evident from the above description of Fig. 1, that the system of the invention has complete flexibility since any transmitting channel may be made to cooperate with any receiving channel by merely adjusting oscillator 15 in the sending circuit channel 1 and oscillator 31 in the receiving circuit of channel 1, or any of the corresponding oscillators of the other channels, to have any one of the desired frequencies assigned to the particular transmitting and receiving channel, respectively. Since all of the components have the same construction, and are merely duplicated from channel to channel, the amount of equipment necessary to provide for different service requirements as these may change from time to time is minimized. By taking advantage of present day techniques in the design and manufacture of miniature components, such as small vacuum tubes and small inductance coils, the bulk and weight of the terminal equipment can be minimized; and also the power requirements can be reduced so that the power pack itself is of comparatively small bulk and light weight. These features contribute further to the portability of a system in accordance with the invention.

Reference will now be made to Fig. 2, where components of a sending and a receiving circuit of the system of Fig. 1 are shown in greater detail.

The subscriber's loop $L_1$ and components of the sending circuit of channel 1, comprising oscillator 10, modulator 11, filter 12, modulator 13, oscillator 15 and filter 14, are similarly numbered in Fig. 2 for identification.

The modulator 11 is shown as comprising a standard telegraph relay 50 having marking and spacing contacts, as indicated. When the relay is released, both input terminals of filter 12 are grounded, and oscillator 10 is effectively disconnected from filter 12. When relay 50 is energized, resistor R is shunted out by the front or marking contact and the relay armature, connecting oscillator 10 to the ungrounded terminal of filter 12. Filter 12 is shown as a two-section band pass filter of standard or ordinary design.

Each of the oscillators 10 and 15 may comprise a vacuum tube oscillator of any known or suitable type, and oscillator 15 is shown as provided with a tuning condenser 51 to enable its frequency to be adjusted.

The modulator 13 is made up of center-tapped input and output transformers, and non-linear elements in lattice form and in such configuration as to offer a high degree of balance to waves from the oscillator 15 in the absence of any waves applied from filter 12. The non-linear elements may comprise dry rectifiers, such as copper oxide rectifiers, or other suitable non-linear elements. This type of modulator by itself is well known and in wide use in carrier systems.

Filter 14 is shown as a two-section low pass filter of ordinary or standard design Its terminals are connected across the sending branch 53 across which other sending circuits may be connected, one such being indicated at 54.

Various switches are shown having a normal or full line position and alternate or dotted line position. When all of these switches are in their normal or full line position, the system is arranged for two-way, two-wire operation over the line $LL_1$ and for the transmitting channels to operate in a high frequency group and the receivers in a low frequency group.

For example, the output waves from the transmitting channels as just described are sent through a switch 55 in its full line position through the coupling transformer 56 into the line $LL_1$. Waves received over the line $LL_1$ from a distant station are transmitted through transformer 56, switch 55, and switches 57 and 58, low pass filter 59, and switches 60, 61 to the receiving branch 62 across which the receiving channels are connected, as indicated by the branches 63 and 64 for example.

If switches 58 and 60 are used in their alternate or dotted line position, then only waves in a high frequency group transmitted through the high pass filter 65 would be impressed on the receiving circuit branch 62, and in that case it is necessary to adjust the sending circuits of Fig. 2 to operate in the lower of the two directional groups and the receiving circuits to operate in the higher frequency group. The system may be set up for four-wire operation by throwing switches 57, 61 and 66 to their alternate or dotted line positions. The system can be set up to provide two-way operation over line $LL_2$ by moving switches 55 and 66 to their alternate or dotted line positions.

Referring to the receiving circuit shown in detail, the elements are given numbers to correspond to the elements in the receiving circuit of channel 1 of Fig. 1. The oscillator 31 is provided with a tuning condenser 68 and may be similar in construction to oscillator 15 of Fig. 2. The modulator 39 may be a duplicate of the modulator 13 of Fig. 2. Filter 43 is shown as a composite narrow band pass filter of known type. The amplifier-detector 44 is shown as comprising an initial amplifying section 70, which may comprise one or more stages, followed by a bridge or ring type detector 71 made up of dry rectifiers connected in bridge configuration, such as copper oxide or other non-linear elements. This is followed by a direct current amplifier 72, the output of which is connected to the receiving relay 73. The amplifier-detector 44 may be of known type such as those used commonly in carrier telegraph channels and may be provided with level compensating devices to meet the requirements of any given situation. One type of amplifier-detector with associated level compensating device, which might be used at this point for example, is shown in Patent 2,182,841 to J. R. Davey and J. L. Hysko, issued December 12, 1939.

Receiving relay 73 is provided with marking and spacing contacts as indicated, and is shown for illustration as connected to these contacts to relay 50 and through the loop $L_1$ to provide half duplex operation in accordance with standard or known practice. Any other desired type of connection for the subscriber loop may be used in accordance with standard telegraph practice to provide the type of service required, such as full duplex or other type, the type of connection used for the sending and receiving relays in itself forming no part of the present invention.

The filter 12 in the sending circuit and the filter 43 in the receiving circuit, it to be noted, are selective of frequencies that are high in comparison with any of the transmitted channel frequencies. This makes for economy in filter construction since the pass range represents a much smaller percentage of the mid-band frequencies than would be the case in filters selective to the channel frequencies themselves. Also the low pass filters 14 need have only reasonably sharp cut-offs since they do not separate closely adjacent ranges.

The frequency assignments as given herein can be shown to result in a minimum of cross-talk or intermodulation between channels by considering all of the significant intermodulation products and the way in which they are disposed of, first at the sending end and then at the receiving end.

The high frequency waves applied to the first stage and second stage modulators of each channel produce difference frequencies ranging from 425 to 2295 P. P. S. all of which are desired and fall within the pass bands of the low pass filters leading to the multiplex line. The corresponding summation frequencies extend from 13005 P. P. S. upwards and are all eliminated by the low pass filters. The components representing twice the frequency of either of these high frequency waves minus the frequency of the other all lie in a range extending from 3485 P. P. S. upwards in frequency and are eliminated by the low pass filters. Only the desired frequencies representing the signals, therefore, are allowed to reach the multiplex line.

At the receiver, all received channel currents produce sum and difference frequencies when beat against one another in the receiving modulators. The sum frequencies extend from 1020 to 4420 P. P. S. all of which are outside the pass band of the channel filters 43, which as stated is $4590 \pm 55$ P. P. S. The corresponding difference frequencies are all much lower and are similarly suppressed. Then there are the products representing twice the frequency of each channel minus the frequency of any other channel. These are all equal to odd multiples of 85 cycles from 85 to 6715 P. P. S. and are eliminated by the receiving filters 43 which have a pass band centered at an even multiple of 85 cycles. Products representing arithmetic sums of any three channel frequencies are odd multiples of 85 cycles whereas components representing the sum of any two channel frequencies minus any other channel frequency do not extend above 3995 P. P. S. and in either case are suppressed by the receiving filters 43. The triple of any channel frequency less the double of any other channel frequency is always an odd harmonic of 85 cycles and so is eliminated by filters 43. This accounts for all of the interchannel products of sufficient magnitude to be of concern.

Besides the above-mentioned products, there are produced at the receiver various modulation products by interaction between received channel frequencies and the locally supplied waves for the receiving modulators. The difference frequencies as already mentioned are the desired ones and each falls within the pass band of the filter 43 of the particular channel. The sum frequencies are obviously all above 5440 P. P. S., or above the filter pass range. This is also true of components representing twice the frequency of the locally supplied high frequency wave plus or minus any channel frequency, all of which lie well above the pass band of filters 43, whereas components representing twice the frequency of any received channel wave plus or minus the frequency of the locally supplied wave are all odd multiples of 85 cycles and therefore outside the pass band of filters 43.

It is seen from this analysis that no matter how the sending and receiving channels may be assembled to make up a system, whether of few or many channels, the resulting system will be free of all important intermodulation products that might be disturbing to normal operation. Quality and reliability have not been sacrificed to flexibility, yet the system is completely flexible.

The invention is not to be construed as restricted to the details or particular values disclosed, these being representative of a practical embodiment and illustrative rather than limiting.

What is claimed is:

1. In a multichannel voice frequency carrier telegraph system, a common transmission line for all of the channels, a plurality of sending circuits of substantially identical construction connected to one end of said line for respectively supplying thereto a carrier wave of a different voice frequency modulated with telegraph signals, representing the different carrier channels on said line, each of said sending circuits including two tandem-connected modulator stages which are substantially alike for all circuits, the first stage modulator of each channel having an input for applying telegraph pulses thereto, means to supply waves of the same frequency to the first stage modulator of all circuits for modulation therein by the telegraph pulses applied thereto, the frequency of said waves being more than three times higher than the frequency of the highest voice frequency channel, means for selecting the pulse-modulated waves of said same frequency in the output of said first modulator stage in each sending circuit, like variable frequency sources of waves for the second stage modulators of the several sending circuits each adjusted to supply waves of a different frequency to the second modulator of each sending circuit for combination therein with the selected wave of said same frequency in its input to produce sum and difference frequency components of the combined waves, the frequencies of the waves of said different frequency supplied to the second modulator of each sending circuit being lower than the frequency of the waves supplied to the first stage modulator of that circuit by the frequency of the corresponding voice frequency channel, and a low pass filter in each circuit between the second stage modulator and the common transmission line for selecting and transmitting to said line the difference frequency components appearing in the output of the preceding second stage modulator, all of said filters having the same cut-off frequency which is higher than the frequency of any of the voice frequency carrier waves and lower than the frequency of any of the waves supplied from said variable frequency sources to the second stage modulators.

2. In a multiplex carrier telegraph system, means to transmit telegraph signals in a plurality of channels by means of carrier waves having different frequencies that are alternate multiples of a base frequency, receiving circuits therefor, each receiving circuit having a modulator supplied with all of the received carrier waves, means for supplying to the modulator in each receiving circuit other waves whose frequencies from channel to channel differ by the channel separation frequency and are like-order alternate multiples of said base frequency and more than twice as high as the highest received carrier frequency, for combination therein with the received carrier waves, a like band pass filter following the modulator in each of said receiving circuits, with a pass band having a mid-band frequency equal to an intermediate multiple of said base frequency for selectively passing the difference frequency waves appearing in the output of that modulator, and a detector following said filter in each receiving circuit for converting the selected waves into direct current telegraph pulses.

3. In a multiplex carrier telegraph system, means for transmitting over a common medium carrier telegraph signals in separate channels on carrier waves having frequencies which are odd multiples of a base frequency, receiving circuits for the respective channels, each receiving circuit comprising a receiving modulator with an associated source of beating waves, a band filter and a detector in that order, these apparatus elements being duplicated from channel to channel except for the frequency of the source of beating waves which differs from channel to channel by the frequency spacing of the carrier waves, said beating waves all having higher frequencies than any received carrier wave frequency whereby the difference frequency component between the beating wave in any receiving circuit and only one of the received carrier waves is selectively passed through the band filter of that receiving circuit, the mid-frequency of the pass band of each said band filter being equal to an even multiple of said base frequency.

4. A multiplex carrier telegraph system comprising a common signal transmission path, two or more carrier telegraph sending circuits connected to one end of said path and a corresponding number of carrier telegraph receiving circuits connected to the other end of said path, each sending circuit having a high frequency input section incorporating a high frequency controller adapted to be actuated by telegraph signals to be transmitted, and a low frequency output section feeding into said one end of said path, each receiving circuit having a low frequency input section fed from the other end of said path, and a high frequency output section of like design, including a telegraph responder for reproducing the telegraph signals from the received carrier waves, each sending circuit output section including a low-pass filter of like design, having a cut-off frequency slightly above the highest carrier frequency transmitted by any sending circuit to said path.

5. In a multiplex carrier telegraph system, a common signal transmission line and a multi-channel carrier telegraph transmitter employing double modulation in each channel, feeding into said line, each channel of said transmitter including a first modulator supplied with waves of a given frequency which is the same for all channels and high in comparison with any of the channel carrier frequencies supplied to said line, a second modulator of like design for all channels, supplied with a high frequency wave of a frequency which is different for each channel, each lower than and differing from said given frequency by the carrier frequency for the respective channel and a low-pass filter of like design for all channels, having a cut-off frequency slightly above the frequency of the highest channel carrier frequency.

FRED J. SINGER.

References Cited in the file of this patent

UNITED STATES PATENTS

| Number | Name | Date |
|---|---|---|
| 1,745,981 | Chireix | Feb. 4, 1930 |
| 1,907,109 | Hinton | May 2, 1933 |
| 2,241,078 | Vreeland | May 6, 1941 |
| 2,314,422 | Phelps | Mar. 23, 1943 |
| 2,374,567 | Taylor | Apr. 24, 1945 |
| 2,449,391 | Kogane | Sept. 14, 1948 |
| 2,494,370 | Swartzel et al. | Jan. 10, 1950 |
| 2,522,846 | Stewart | Sept. 19, 1950 |